Figure 1:
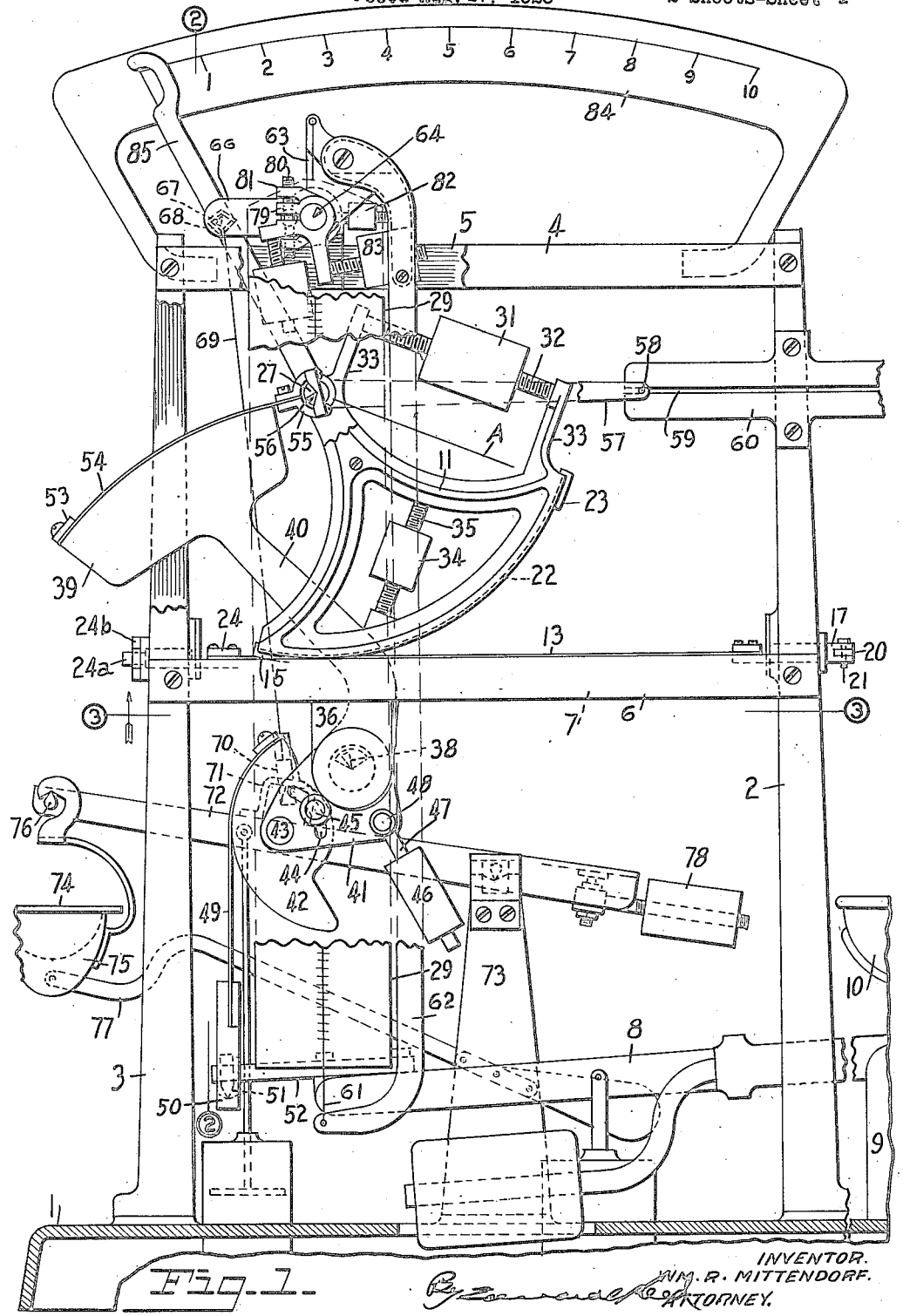

Nov. 22, 1927.

W. R. MITTENDORF 1,650,226

COMPUTING SCALE

Filed Aug. 17, 1923    2 Sheets-Sheet 1

INVENTOR.
WM. R. MITTENDORF.
ATTORNEY.

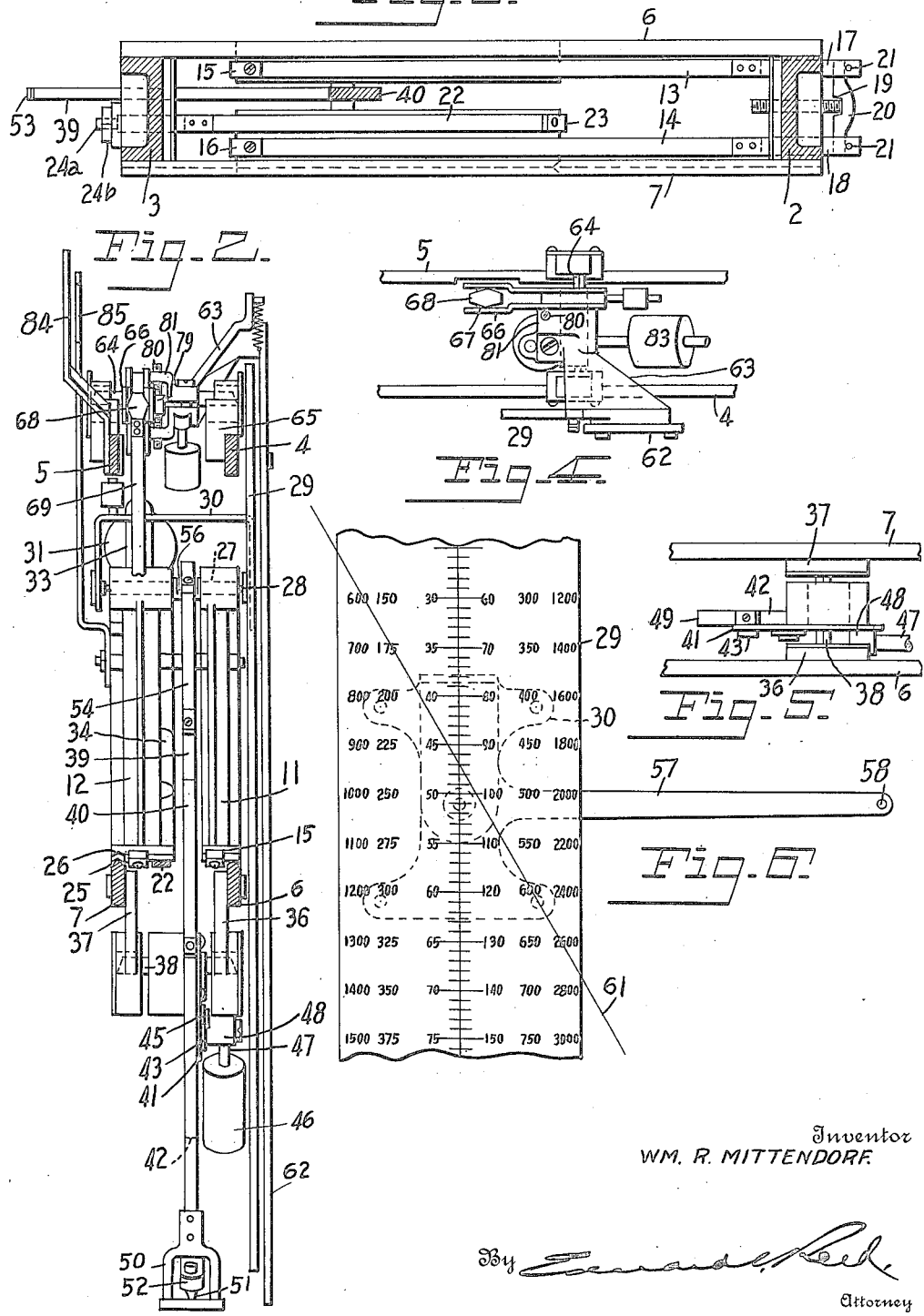

Patented Nov. 22, 1927.

1,650,226

UNITED STATES PATENT OFFICE.

WILLIAM R. MITTENDORF, OF CINCINNATI, OHIO, ASSIGNOR, BY MESNE ASSIGNMENTS, TO THE WATSON EXPERIMENTAL LABORATORY COMPANY, OF DAYTON, OHIO, A CORPORATION OF OHIO.

COMPUTING SCALE.

Application filed August 17, 1923. Serial No. 657,914.

This invention relates to scales and the present application is a continuation of the application filed by me September 23, 1922, Serial No. 590,085, in so far as the novel subject matter is common to the two applications.

One object of the invention is to provide a computing scale having a movable chart, the movement of which is so controlled that it will travel in a straight line, and in which the divisions of movement of the chart will be equal for equal increments of weight on the scale platform.

A further object of the invention is to provide such a scale in which the operating and controlling mechanism will be simple in its construction and operation and will not be easily disarranged.

Other objects of the invention will appear as the mechanism is described in detail.

In the accompanying drawings Fig. 1 is a front elevation, partly broken away, of a scale embodying my invention; Fig. 2 is a sectional view taken on the line 2—2 of Fig. 1; Fig. 3 is a sectional view taken on the line 3—3 of Fig. 1, looking in the direction of the arrows; Fig. 4 is a plan view of the supporting and controlling mechanism for the pivoted indicating member; Fig. 5 is a plan view of the cam unit; and Fig. 6 is a detail view of portions of the cooperating indicating members.

In these drawings I have illustrated one embodiment of my invention and have shown the same as applied to a scale designed for counting by weight. It will be understood that the present embodiment has been chosen for the purposes of illustration only and that the invention may be applied to computing scales of various kinds and, further, that the mechanism itself may take various forms without departing from the spirit of the invention.

In the particular construction here illustrated the scale comprises a main frame consisting of a base 1 having mounted thereon upright standards 2 and 3 connected one to the other near their upper ends by transverse bars 4 and 5 and connected one to the other between their upper and lower ends by transverse bars 6 and 7. A load actuated weighing mechanism, or load balance, is mounted in the main frame and comprises a main lever 8 pivotally mounted on a standard 9 carried by the base 1 and this lever has mounted on the outer end thereof a load receptacle or platform 10 which may be of any suitable construction. The lever 8 is here shown as a lever of the first principle but it will be understood that this lever may be of any suitable character. The inner end of the lever of the load balance is connected with one of the indicating members, in the present instance the chart, in a manner hereinafter described. The indicating, or computing, devices of the scale are similar to those shown and described in the above mentioned application and consist of two indicating members, one of which comprises an elongated chart having preferably a single series of value graduations, and the other of which comprises a thin indicating member, such as a wire, arranged to normally extend parallel with the chart. The two indicating members are so controlled that in the effecting of a computation they will be moved into intersecting positions and the graduation on the chart which is intersected by the wire will represent the result of the computation. In the present instance, where the invention is applied to a counting scale, this computation will be the number of articles on the load platform. In the present construction the chart is controlled by the load balance and the operating and controlling mechanism therefore is of such a character that the chart will be moved in a straight line transverse to its length and the divisions of its movement will be equal for equal increments of weight on the load balance. To accomplish this I have provided a chart supporting structure having segmental portions mounted upon a suitable supporting surface or track on which the supporting structure has a rolling movement and I have mounted the chart on the supporting structure at the axis about which the segmental surface is described. This structure may consist of one or more parts but, as here shown, it comprises two members 11 and 12 each having its lower end segmental in shape and which are mounted respectively on the frame members or bars 6 and 7, these bars constituting supporting surfaces over which the supporting structure moves. The segmental structure may be held in place on the tracks and its movement thereon controlled in any suitable manner but, as here shown, I have connected with the left hand end of the segmental portion of each member of the structure a ribbon, 13 and 14, the ribbons being connected with the structures in any suitable manner, as by means of straps 15 and 16. The ribbons extend along the respective tracks 6 and 7 and are connected at their right hand ends to the main frame. Preferably the connection is an adjustable one so that the ribbons may be maintained taut and an equal tension may be applied to each ribbon. To this end I have connected the ribbons at their right hand ends with bars 17 and 18 mounted on the upright member 2 of the main frame for movement transversely to that member. This movement is accomplished by means of a set screw 19 screw threaded into the frame member 2 and bearing against an equalizing bar 20, the ends of which bear against pins 21 carried by the respective bars 17 and 18. A third ribbon 22 is connected at one end to the right hand end of the segmental portion of one member of the structure, preferably by means of a clip 23, and at its left hand end to a bar 24 mounted on the upright member 3 of the main frame for movement transversely thereto. Preferably the bar 24 has secured therto a rod or pin 24$^a$ which extends through the upright member 3 and a nut 24$^b$ is mounted on this rod and bears against the surface of the member 3 to adjust the bar 24. By adjusting the bar 24 and the bars 17 and 18 the position of the segment may be adjusted longitudinally of the bars. The tension on the ribbon 22 which is connected with the bar 24 may be controlled by the tension of the ribbons 13 and 14. The action of these ribbons on the segment is to hold the same firmly in contact with the tracks and to prevent the same from slipping along the same, thereby causing a uniform rolling movement of the structure upon the supporting surface. Preferably one of the track members, in the present instance the bar 7, has its upper lateral edges beveled, as shown at 25, and the corresponding member 11 of the segmental structure has a V shaped groove 26 to receive the beveled edge of the track and thus hold the segment against lateral displacement without interfering with its free rolling movement. The two portions of the segmental structure while formed separate one from the other are rigidly connected one to the other so as to constitute a single unitary structure, this being accomplished by rigidly securing the two members, at the axis about which their segmental surfaces are described, to a pivot pin or shaft 27, the ends of which extend beyond the ends of the respective members and are reduced to form pintles 28. The chart, which is shown at 29, is pivotally mounted on the segmental structure at the axis thereof and above the longitudinal center of the chart so that the chart would tend to hang normally in a vertical position. This connection is accomplished in the present instance by rigidly securing the chart to one arm of a yoke shaped structure 30 the two arms of which are provided with bearings engaging the pintles 28 of the pivot pin 27 and, as here shown, I have provided means for establishing the center of gravity of the chart at the axis thereof.

Preferably the segmental structure with its associated parts is not counterbalanced around its axis but has its center of gravity so arranged that it will, in itself, serve in part as the counterbalance of the load balance, as will be hereinafter described, it being desired to have the segmental structure and the parts attached thereto serve as a pendulum counterbalance, in which case it becomes in effect the pendulum. To this end it is necessary to establish the center of gravity of the segment, and the parts attached to it, in proper relation to the axis on the segment in order to get the right counterbalancing effect. This center of gravity must be established, in the present instance, substantially along the line A, as the counterbalancing action is that of a descending pendulum. It will be noted that practically all of the mass of the segment is on the lower left hand side of the line A; therefore, it becomes necessary to locate an offsetting mass on the upper right hand side of said line in order to position the center of gravity approximately on said line. This offsetting mass is provided in the present device mainly by a weight 31 mounted on a screw threaded rod 32 carried by arms 33 projecting from one member of the segmental structure. However, in order that the center of gravity may be definitely located on the line A I have provided a second weight 34 mounted on a screw threaded rod 35 carried by the same member of the segment which carries the weight 31 and so arranged that it is adjustable toward and from the line A. By making the weight 34 adjustable toward and from the line A and the weight 31 adjustable parallel with the line A the center of gravity may be established not only on the line A but may be located at the proper distance from the axis of the segment. Thus it will be seen that the adjustment of the weight 34 acts to distribute the weight of the whole mass equally on each side of the line A and that the adjustment of the weight 31 acts to locate the center of gravity of the whole mass at the proper distance from the axis of the segmental structure without affecting the distribution of the mass on each side of the line. It will be apparent, however, that the mechanism may, if desired, be so arranged as to provide a counterbalancing action equivalent to that of a rising pendulum, which is opposed to the weight of the load on the platform.

The segmental structure may be operatively connected with the main lever of the load balance in any suitable manner and in the above mentioned application a cam is mounted on the axis of the segment and connected to the lever by means of a ribbon. I prefer, however, to interpose between the axis of the segmental structure and the lever an intermediate structure which will enable me to secure very accurate divisions of movement of the computing chart, and in the particular structure here shown I have arranged the cam on an independent axis below the axis of the segmental structure and have connected it with that axis and with the lever. To this end I have provided the track members or bars 6 and 7 with depending plates 36 and 37 having V bearings to receive the knife edged end portions of a pivot pin or shaft 38. Rigidly secured to the pivot pin 38 is a segment comprising a main portion 39 and a supporting arm 40 the end of which is rigidly secured to the pivot pin 38. Rigidly secured to the hub portion of the arm 40 is a plate 41 which carries the cam 42. The cam is preferably adjustably mounted on the plate 41 and to this end I have, in the present instance, pivotally mounted the cam on the plate, as shown at 43, and have provided the plate with an arcuate slot 44 through which extends a screw or other suitable clamping device 45 by means of which the cam may be rigidly secured in any adjusted position with relation to the plate. It is desirable that the center of gravity of the intermediate segment 39 and its associated parts, that is, the center of gravity of the segment unit should be established exactly on the axis thereof. For this purpose I have provided the intermediate segment unit with a counterbalancing weight 46 which is here shown as screw threaded on a rod 47 which is adjustable to different angular positions with relation to the unit. Preferably the rod or screw 47 is pivotally connected with the plate 41 by means of a clamping screw 48 by means of which it can be adjusted to various angular positions with relation to the plate and held rigidly in position with relation to the plate after it has been adjusted relatively thereto. The adjustment of the weight 46 on the screw threaded rod 47 and the angular adjustment of the rod with relation to the plate 41 enables the center of gravity of the intermediate segment unit to be established exactly on the axis of the unit so that the counterbalancing action of the rolling segment structure, 11 and 12, is not interfered with or influenced in any way by the movement or weight of the intermediate segment unit. The cam 42 has secured thereto a ribbon 49 the lower end of which is provided with a stirrup 50 to receive a needle point 51 depending from the nose piece 52 of the main lever 8 of the load balance. The intermediate segment 39 has secured thereto, preferably by means of a clip 53, a ribbon 54 the other end of which is provided with a stirrup 55 having a V shaped bearing to engage a knife edged pivot 56 formed on the pivot rod 27 at the axis of the rolling segment structure, this knife edged portion being, in the present instance, arranged between the hub portions of the two members 11 and 12 of the structure, the end of the ribbon 54 being thus connected with the segmental structure at the exact axis thereof. By reason of this construction the proper variations in leverage may be controlled by the shape of the cam 42 so as to obtain even divisions of movement of the segmental structure and chart and, as the power of the main lever 8 of the load balance is applied to the segmental structure exactly at the axis thereof in all positions of the segment, the vibratory action of the segmental structure is the same in all positions, due to the fact that the center of gravity thereof is not affected by the variable tensions of the ribbon 54.

As has been stated, the mounting of the computing chart 29 is such that its center of gravity is established at the axis thereof and in order to hold the same against oscillating movement and maintain it at all times in the proper position, I have provided the chart with a guide arm 57 which, in the present instance, is formed integral with the yoke shaped structure 30 to which the chart is secured. The outer end of the arm 57 has mounted therein a pin 58 which travels in a fixed guideway which, in the present instance, is in the nature of a slot 59 formed between the two parts of a structure 60 rigidly secured to the main frame. The pin 58 is of a diameter slightly less than the width of the slot 59 and is so arranged that when the chart is in a true vertical position it will be out of contact with both walls of the slot and will consequently move freely and without friction within the slot, touching the walls of the slot only when the chart tends to move from a vertical position, and as the chart is balanced about its axis no appreciable pressure will be exerted by the pin upon the wall of the slot during these brief contacts.

The second indicating member or wire, which is shown at 61, is preferably pivotally mounted and, as here shown, this wire is carried by a supporting structure 62 having at its upper end a member 63 which is rigidly secured to a pivot pin or shaft 64 having knife edged portions resting in V shaped bearings formed in plates 65 carried by the frame members 4 and 5. Mounted on the pivot pin 64 is an arm 66 which is operatively connected with the portion 63 of the supporting structure 62 and which is provided in its outer end with a knife edge pivot 67 with which engages a bearing formed in a stirrup 68 secured to a ribbon 69 the lower end of which is provided with a stirrup 70 having pivotal connection with a bracket 71 carried by a lever 72 of the unit balance, which lever is here shown as a lever of the second principle but which may be of any suitable character. This lever 72 is mounted between its ends in a standard 73 and is provided at one end with a unit receptacle 74 which, in the present instance, is mounted on a holder 75 pivotally connected with the lever at 76. A check link 77 extending between the holder 75 and the standard 73 holds the unit receptacle against swinging movement. The unit lever is also provided, at that end opposite the unit receptacle, with an adjustable counterbalancing weight 78. The arm 66 may be connected with the member 63 of the supporting structure for the wire in any suitable manner but in order that this connection may be an adjustable one I have provided the arm with a laterally extending lug 79 arranged between screws 80 mounted in arms 81 formed on the member 63. The wire supporting structure 63 is also provided with means for establishing the center of gravity thereof with relation to its axis and, as here shown, is provided with counterbalancing weights 82 and 83. In this manner I have provided a counterbalance for the weight of the unit, the action of which is that of a rising pendulum but it will be obvious that the mechanism may, if desired, be so arranged that the counterbalancing action will be that of a reverse pendulum, which descends as the load is applied to the main lever.

If desired the scale may be provided with means for indicating weight as well as the result of the computation and, as here shown, a weight indicating chart 84 is mounted on the main frame and a weight indicating arm 85 is rigidly secured to the rolling segment structure and is arranged to travel over the chart 84, thus indicating weight simultaneously with the indication of the computation.

It will be apparent that when the scale is to be used to count by weight a unit consisting of one or more articles will be placed in the unit receptacle 74, thereby moving the indicator wire 61 about its axis to a position corresponding to the weight of the unit. The mass of articles to be counted is then placed upon the load platform 10 and the computing chart will be moved in a straight line a distance exactly proportionate to the weight on the load platform and the graduation on the chart which is intersected by the wire will indicate the exact number of units on the load platform. It will be apparent that by means of this mechanism I am enabled to utilize a single series of graduations to compute a result based on various units of computation, such as units of different weight in counting, or different prices per pound to determine money values. This results from the fact that the significance of the graduations on the chart change with each change of the unit of computation, that is, the divisions of movement of the load actuated indicating member, as established by the graduations on the chart, increase in distance, when counting, as the weight of the unit increases. In other words as the weight of the unit increases and the angle of intersection between the two indicating members becomes more obtuse the load actuated indicating member moves a greater distance for each graduation on the chart. For example, if a unit weighing one ounce is placed in the unit receptacle, one pound in weight of such units on the load platform will move the load actuated indicating member such a distance as to cause the wire to intersect the center line of the chart at the sixteenth graduation, each graduation thus representing a single unit. If a unit weighing two ounces is placed in the unit receptacle one pound in weight of such units on the load platform will cause the load actuated indicating member to move the same distance but because of the altered position of the wire with relation to the chart the wire will register with the eighth graduation thereon, thus indicating that there are eight articles on the load platform. Thus the change in the unit of computation changes the significance of the value graduations on the chart, this being accomplished without in any manner changing or affecting the weighing mechanism.

While I have shown and described one embodiment of my invention I wish it to be understood that I do not desire to be limited to the details thereof as various modifications may appear to a person skilled in the art.

Having now fully described my invention what I claim as new and desire to secure by Letters Patent, is:

1. In a scale, a weight actuated member, a counterbalance operatively connected with said weight actuated member, an indicating member supported by said counterbalance and movable therewith under the influence of a load on said weight actuated member, and a second indicating member movable into a position to intersect the first mentioned indicating member.

2. In a scale, a weight actuated member, a counterbalance operatively connected with said weight actuated member, an indicating member supported by said counterbalance and movable therewith under the influence of a load on said weight actuated member, a second indicating member movable into a position to intersect the first mentioned indicating member, and means for adjusting said second indicating member according to a unit of computation.

3. In a scale, a weight actuated member, a counterbalance operatively connected with said weight actuated member, a chart supported by said counterbalance and movable therewith, a unit receptacle mounted for movement, and an indicating member connected with said unit receptacle and movable thereby, said chart and said indicating member being so arranged that they will be moved by said weight actuated member and said unit receptacle, respectively, into intersecting positions.

4. In a scale, a track, a structure having a segmental portion mounted on said track for rolling movement thereon, an indicating member pivotally mounted on said structure at the axis thereof, and a weight actuated lever operatively connected with said structure to control the movement thereof, said structure having its center of gravity so arranged that it will act as a pendulum for said weight actuated lever.

5. In a scale, a track, a structure having a segmental portion mounted on said track for rolling movement thereon, an indicating member pivotally mounted on said structure at the axis thereof, a weight actuated member operatively connected with said structure to control the movement thereof, and weights adjustably mounted on said segmental structure and arranged to so distribute the weight of the structure and its associated parts that said structure will act as a pendulum for said weight actuated member.

6. In a scale, a weight actuated member, a counterbalancing segment operatively connected with said weight actuated member, a chart supported by said counterbalancing segment to maintain a substantially vertical position, an indicating member cooperating with said chart, and means to actuate said indicating member according to a unit of computation and move it into a position to intersect said chart.

7. In a scale, a weight actuated member, a counterbalancing segment operatively connected with said weight actuated member, a chart supported by said counterbalancing segment to maintain a substantially vertical position, a unit receptacle mounted for movement, and an indicating member operatively connected with said unit receptacle and movable into a position to intersect said chart.

8. In a scale, a weight actuated member, a rolling segmental counterbalance operatively connected with said weight actuated member, a computing chart supported by said counterbalance and having a single series of graduations, and means for changing the significance of said graduations without affecting or displacing any member of said weighing mechanism.

9. In a scale, a weight actuated member, a rolling segmental counterbalance operatively connected with said weight actuated member, a computing chart supported by said counterbalance and having a single series of graduations, the significance of which may be varied in accordance with a selected unit of computation, and a member cooperating with said chart for establishing said unit of computation without affecting said weight actuated member.

10. In a scale, relatively movable indicating members cooperating to effect a computation, a segmental structure having rolling movement on its segmental surface, one of said indicating members being mounted on said structure at the axis thereof, and a weight actuated member mounted independently of and connected with said segmental structure to control the movement thereof.

11. In a scale, a track, a supporting structure having a segmental portion mounted on said track, an indicating member pivotally mounted on said structure at the axis thereof, and a weight actuated member mounted independently of and operatively connected with said structure to control the movement thereof, and a second indicating member to cooperate with the first mentioned indicating member to indicate the result of a computation.

12. In a scale, a weight actuated member, a segmental structure mounted for rolling movement on its segmental surface, an operative connection between said segmental structure and said weight actuated member, a chart pivotally mounted on said segmental structure at the axis thereof, and an indicating member cooperating with said chart.

13. In a scale, a weight actuated member, a segmental structure mounted for rolling movement on its segmental surface, an operative connection between said segment and said weight actuated member, a chart pivotally mounted on said segmental structure at the axis thereof, a pivoted indicating member to cooperate with said chart, and means for adjusting said pivoted indicating member according to a unit of computation.

14. In a scale, a weight actuated member, a segmental structure mounted for rolling movement on its segmental surface, an operative connection between said segment and said weight actuated member, a chart pivotally mounted on said segmental structure at the axis thereof, a pivoted indicating member to cooperate with said chart, and a unit receptacle mounted for movement and operatively connected with said pivoted indicating member.

15. In a scale, a frame comprising a member having a supporting surface, a segmental structure having its curved end supported on said surface, an indicating member pivotally mounted on said segmental structure at the axis thereof, ribbons connecting said segmental structure with said frame member, said ribbons being attached to the opposite ends of said segmental structure and wrapped thereupon in opposite directions and extending therefrom to said frame member on opposite sides of said segmental structure, and a weight actuated member operatively connected with said segmental structure to control the movement thereof.

16. In a scale, a frame comprising a member having a supporting surface, a structure having a segmental portion mounted on said surface, straps connected at one end with one end of the segmental portion of said structure, and connected at their other ends with said frame member, another strap connected at its end with the other end of said segmental portion of said structure and connected at its other end with said frame member, an indicating member pivotally mounted on said segmental structure at the axis thereof, and a weight actuated member operatively connected with said structure to control the movement thereof.

17. In a scale, a frame comprising a member having a supporting surface, a structure having a segmental portion mounted on said surface, straps each immovably secured at one end to one end of said segmental structure and connected at its other end with said frame member beyond the other end of said segmental structure, another strap immovably secured at its end to the other end of said segmental structure, and connected with said frame member beyond that end of said segmental structure opposite the end to which it is connected, means for adjusting the tension of said straps, an indicating member carried by said segmental structure, and a weight actuated member operatively connected with said segmental structure.

18. In a scale, a frame comprising a member having a supporting surface, a structure having a segmental portion mounted on said surface, a strap connected at one end with one end of the segmental portion of said structure and connected at its other end with said frame member beyond the other end of said segmental portion of said structure, a pair of straps arranged on opposite sides of the first mentioned strap each connected at one end with that end of said segmental structure opposite the end to which the first mentioned strap is connected, members adjustably mounted on said frame and connected with the other ends of the respective last mentioned straps, an equalizing bar connected with both of said members, an adjusting member acting on said equalizing bar to regulate the tension on the several straps, an indicating member carried by the segmental structure, and a weight actuated member operatively connected with said segmental structure.

19. In a scale, a frame comprising a pair of parallel bars, a structure having segmental portions mounted on the respective bars, one portion of said structure having a V-shaped groove therein and a corresponding bar having a beveled portion to enter said groove, oppositely extending straps each having its ends connected respectively with said segmental structure and with one of said bars, an indicating member mounted on said segmental structure at the axis thereof, and a weight actuated member mounted independently of and operatively connected with said segmental structure.

20. In a scale, a weight actuated device comprising a lever, a structure having a segmental portion and mounted for rocking movement on said segmental portion thereof, a chart pivotally mounted on said segmental structure at the axis thereof, and an operative connection between said segmental structure and said lever to control the movement of said chart.

21. In a scale, a weight actuated device comprising a lever, a structure having a segmental portion and mounted for rocking movement on said segmental portion thereof, a chart pivotally mounted on said segmental structure at the axis thereof, a member pivotally mounted between said segmental structure and said lever and having a segmental surface, a ribbon connected with said member, extending over the segmental surface thereof and connected with the said segmental structure at the axis thereof, and means for connecting said member with said lever.

22. In a scale, a weight actuated device comprising a lever, a structure having a segmental portion and mounted for rocking movement on said segmental portion thereof, a chart pivotally mounted on said segmental structure at the axis thereof, a member pivotally mounted between said segmental structure and said lever and having a segmental surface, a ribbon connected with said member, extending over the segmental surface thereof and connected with the said segmental structure at the axis thereof, a cam connected with said member and movable about the axis thereof, and a ribbon connecting said cam with said lever.

23. In a scale, a weight actuated device comprising a lever, a structure having a segmental portion and mounted for rocking movement on said segmental portion thereof, a chart pivotally mounted on said segmental structure at the axis thereof, a cam mounted for movement about an axis spaced from the axis of said segmental structure, a ribbon connecting said cam with said lever, a member rigidly connected with said cam and having a segmental end portion, and a ribbon connecting said member with said segmental structure at the axis thereof.

24. In a scale, a weight actuated device comprising a lever, a structure having a segmental portion and mounted for rocking movement on said segmental portion thereof, a chart pivotally mounted on said segmental structure at the axis thereof, a cam mounted for movement about an axis spaced from the axis of said segmental structure, a ribbon connecting said cam with said lever, a member rigidly connected with said cam and having a segmental end portion, a ribbon connecting said member with said segmental structure at the axis thereof, and means for establishing the center of gravity of said cam and said member at the axis thereof.

25. In a scale, a weight actuated device comprising a lever, a structure having a segmental portion and mounted for rocking movement on said segmental portion thereof, a chart pivotally mounted on said segmental structure at the axis thereof, a cam mounted for movement about an axis spaced from the axis of said segmental structure, a ribbon connecting said cam with said lever, a member rigidly connected with said cam and having a segmental end portion, a ribbon connecting said segmental portion of said member with said segmental structure at the axis thereof, and a weight adjustably connected with said cam and said member to establish the center of gravity thereof.

26. In a scale, a weight actuated device comprising a lever, a structure having a segmental portion and mounted for rocking movement on said segmental portion thereof, a chart pivotally mounted on said segmental structure at the axis thereof, a cam mounted for movement about an axis spaced from the axis of said segmental structure, a ribbon connecting said cam with said lever, a member rigidly connected with said cam and having a segmental end portion, a ribbon connecting said segmental portion of said member with said segmental structure at the axis thereof, a rod pivotally connected with said cam and said member, means for securing said rod in adjusted positions with relation to said cam and said member, and a weight adjustably mounted on said rod.

27. In a scale, a weight actuated device comprising a lever, a structure having a segmental portion and mounted for rocking movement on said segmental portion thereof, a chart pivotally mounted on said segmental structure at the axis thereof, a member pivotally mounted on a fixed axis and having a segmental end portion, a ribbon connecting said end portion of said member with said segmental structure at the axis thereof, a plate rigidly secured to said member, a cam adjustably mounted on said plate, and a ribbon connecting said cam and said lever.

28. In a scale, a weight actuated device comprising a lever, a structure having a segmental portion and mounted for rocking movement on said segmental portion thereof, a chart pivotally mounted on said segmental structure at the axis thereof, a member pivotally mounted on a fixed axis and having a segmental end portion, a ribbon connecting said end portion and said member of said segmental structure at the axis thereof, a plate rigidly secured to said member, a cam adjustably mounted on said plate, a ribbon connecting said cam and said lever, and a weight adjustably mounted on said plate for establishing the center of gravity of said plate and its connected parts.

29. In a scale, a weight actuated device comprising a lever, a structure having a segmental portion and mounted for rocking movement on said segmental portion thereof, a chart pivotally mounted on said segmental structure at the axis thereof, a member pivotally mounted on a fixed axis and having a segmental end portion, a ribbon connecting said end portion of said member with said segmental structure at the axis thereof, a plate rigidly secured to said member, a cam adjustably mounted on said plate, a ribbon connecting said cam and said lever, a rod pivotally mounted on said plate, means for securing said rod in adjusted positions about its axis, and a weight adjustably mounted on said rod.

30. In a scale, a weight actuated device comprising a lever, a structure having a segmental portion and mounted for rocking movement on said segmental portion thereof, a chart pivotally mounted on said segmental structure at the axis thereof, a member pivotally mounted on a fixed axis arranged below the axis of said segmental structure, means for connecting the outer portion of said member with said segmental structure at the axis thereof, a cam connected with said member, a ribbon connecting said cam with said lever, a pivoted indicating member cooperating with said chart, an arm connected with said indicating member, a unit receptacle mounted for movement, an operative connection between said unit receptacle and said arm.

31. In a scale, a load supporting mechanism and a counterbalance operatively connected therewith and having a segmental portion, said load supporting mechanism being mounted independently of said counterbalance, and the point of connection with said counterbalance being located at the axis of said segmental portion.

32. In a scale, a counterbalance having a movable axis, a weight actuated member having an operative connection with said counterbalance at a point coincident with said axis, an indicating member pivotally supported on said counterbalance at said axis, and means for supporting said counterbalance so as to cause said axis to move in a substantially straight line.

33. In a scale, a counterbalance having a movable axis, a weight actuated member having an operative connection with said counterbalance at a point coincident with said axis, an indicating member pivotally supported on said counterbalance at said axis, means for supporting said counterbalance so as to cause said axis to move in a substantially straight line, and a second indicating member to cooperate with the first mentioned indicating member.

34. In a scale, a counterbalance having a movable axis, a weight actuated member having an operative connection with said counterbalance at a point coincident with said axis, an indicating member pivotally supported on said counterbalance at said axis, means for supporting said counterbalance so as to cause said axis to move in a substantially straight line, a second indicating member to cooperate with the first mentioned indicating member, and means to position said second indicating member according to a unit of computation.

35. In a scale, a counterbalance having a movable axis, a weight actuated member having an operative connection with said counterbalance at a point coincident with said axis, an indicating member pivotally supported on said counterbalance at said axis, means for controlling the radial position of said indicating member about said axis, and means for supporting said counterbalance so as to cause said axis to move in a substantially straight line.

36. In a scale, a counterbalance having a movable axis, a weight actuated member having an operative connection with said counterbalance at a point coincident with said axis, an indicating member pivotally supported on said counterbalance at said axis, means for controlling the radial position of said indicating member about said axis, means for establishing the center of gravity of said indicating member at the axis thereof, and means for supporting said counterbalance so as to cause said axis to move in a substantially straight line.

37. In a scale, a segmental structure having a movable axis, a weight actuated member having an operative connection with said structure at a point coincident with said axis, an indicating member pivotally supported on said structure at said axis, means for supporting said structure so as to cause said axis to move in a substantially straight line, a weight chart, and an indicating member controlled by said weight actuated member and cooperating with said chart.

38. In a scale, a segmental structure having a movable axis, a weight actuated member having an operative connection with said structure at a point coincident with said axis, an indicating member pivotally supported on said structure at said axis, means for supporting said structure so as to cause said axis to move in a substantially straight line, a second indicating member to cooperate with the first mentioned indicating member, a weight chart, and an indicating member controlled by said weight actuated member and cooperating with said chart.

39. In a scale, a segmental structure having a movable axis, a weight actuated member having an operative connection with said structure at a point coincident with said axis, an indicating member pivotally supported on said structure at said axis, means for supporting said structure so as to cause said axis to move in a substantially straight line, a second indicating member to cooperate with the first mentioned indicating member, means to position said second indicating member according to a unit of computation, a weight chart, and an indicating member controlled by said weight actuated member and cooperating with said chart.

In testimony whereof, I affix my signature hereto.

WILLIAM R. MITTENDORF.